(12) United States Patent
Ding

(10) Patent No.: US 7,980,449 B2
(45) Date of Patent: Jul. 19, 2011

(54) THERMAL STIR WELDING APPARATUS

(75) Inventor: R. Jeffrey Ding, Athens, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/385,168

(22) Filed: Feb. 28, 2003

(65) Prior Publication Data
US 2003/0217994 A1    Nov. 27, 2003

Related U.S. Application Data

(62) Division of application No. 09/994,506, filed on Nov. 27, 2001, now abandoned.

(51) Int. Cl.
B23K 31/02    (2006.01)
(52) U.S. Cl. .............. 228/227; 228/2.1; 228/2.3; 228/8; 228/112.1; 228/232
(58) Field of Classification Search .............. 228/112.1, 228/227, 232, 2.1, 2.3, 8
See application file for complete search history.

(56) References Cited

U.S. PATENT DOCUMENTS

| | | | | |
|---|---|---|---|---|
| 4,871,894 A * | 10/1989 | Suzuki et al. | ................... | 219/93 |
| 5,460,317 A * | 10/1995 | Thomas et al. | ............. | 228/112.1 |
| 5,697,545 A * | 12/1997 | Jennings et al. | ............. | 228/112.1 |
| 6,051,325 A * | 4/2000 | Talwar et al. | ................. | 428/593 |
| 6,053,391 A * | 4/2000 | Heideman et al. | ............. | 228/2.1 |
| 6,160,237 A * | 12/2000 | Schneefeld et al. | ........ | 219/78.02 |
| 6,168,066 B1 * | 1/2001 | Arbegast | ....................... | 228/102 |
| 6,199,745 B1 * | 3/2001 | Campbell et al. | ........... | 228/112.1 |
| 6,237,835 B1 * | 5/2001 | Litwinski et al. | ........... | 228/112.1 |
| 6,305,315 B1 * | 10/2001 | Suzuki et al. | .......... | 118/723 MW |
| 6,364,197 B1 * | 4/2002 | Oelgoetz et al. | ........... | 228/112.1 |
| 6,530,513 B2 * | 3/2003 | Ezumi et al. | ............... | 228/112.1 |
| 6,543,670 B2 * | 4/2003 | Mahoney | .................... | 228/112.1 |
| 6,772,935 B2 * | 8/2004 | Scheglmann et al. | ...... | 228/112.1 |

(Continued)

FOREIGN PATENT DOCUMENTS

EP    0972605 A2 *    1/2000

(Continued)

OTHER PUBLICATIONS

C.J. Dawes, D.N. Almond and E.R. Watts, "Development of the New Friction Stir Technique for :Welding Aluminium—Phase I," Final Report, TWI Abington Hall, Abington (Cambridge CB1 6AL, United Kingdom), (Jul. 1, 1994).

(Continued)

Primary Examiner — Kiley Stoner
Assistant Examiner — Paul A Wartalowicz
(74) Attorney, Agent, or Firm — Ross F. Hunt, Jr.; Douglas E. Jackson; James J. McGroary

(57) ABSTRACT

A welding method and apparatus are provided for forming a weld joint between first and second elements of a workpiece. The method includes heating the first and second elements to form an interface of material in a plasticized or melted state interface between the elements. The interface material is then allowed to cool to a plasticized state if previously in a melted state. The interface material, while in the plasticized state, is then mixed, for example, using a grinding/extruding process, to remove any dendritic-type weld microstructures introduced into the interface material during the heating process.

17 Claims, 1 Drawing Sheet

U.S. PATENT DOCUMENTS

| | | | |
|---|---|---|---|
| 6,793,118 B2 * | 9/2004 | Palm | 228/112.1 |
| 6,854,632 B1 * | 2/2005 | Larsson | 228/2.1 |
| 2003/0116609 A1 * | 6/2003 | Dracup et al. | 228/112.1 |

FOREIGN PATENT DOCUMENTS

| | | | |
|---|---|---|---|
| WO | WO 99/32254 | * | 7/1999 |
| WO | WO 99/39861 | * | 8/1999 |

OTHER PUBLICATIONS

C.J. Dawes, P.L., Threadgill, E.J.R. Spurgin and D.G. Staines, "Development of the New Friction Stir Technique for Welding Aluminium—Phase II," Final Report . TWI, Abington Hall, Abington (Cambridge CB1 6AL, United Kingdom), (Nov. 1, 1995).

* cited by examiner

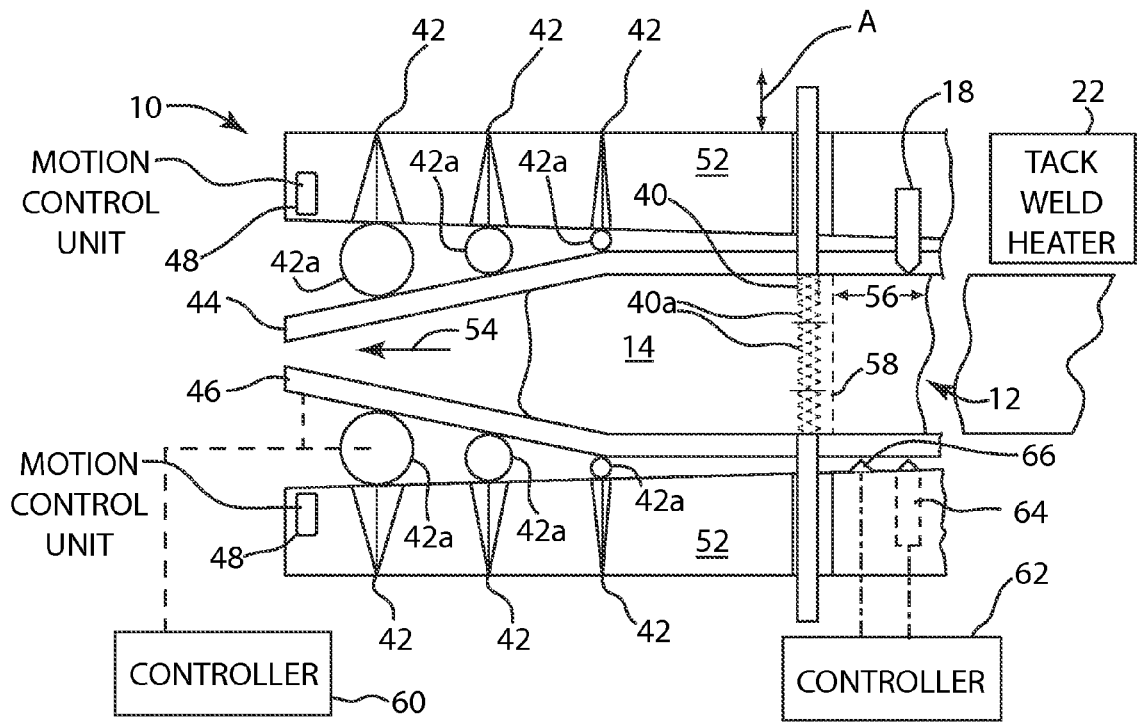
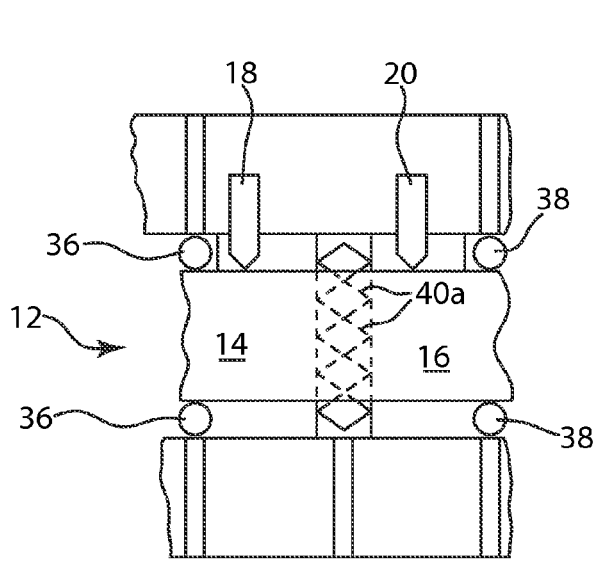
FIG. 2
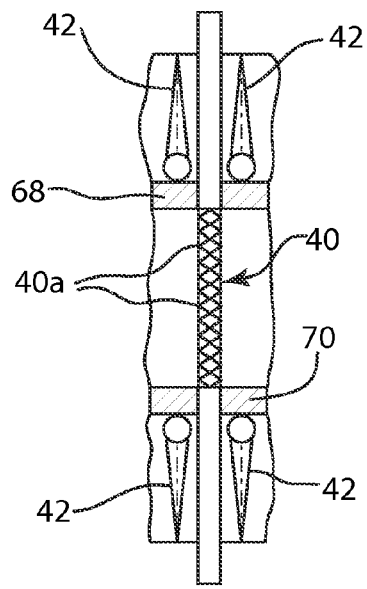
FIG. 3

THERMAL STIR WELDING APPARATUS

CROSS REFERENCE TO RELATED APPLICATION

This application is a division of application Ser. No. 09/994,506 filed on Nov. 27, 2001 now abandoned.

ORIGIN OF THE INVENTION

This invention was made by employees of the United States Government and may be manufactured and used by or for the Government for governmental purposes without the payment of any royalties.

BACKGROUND OF THE INVENTION

1. Field of the Invention

The present invention relates to a welding method and apparatus, and in particular, to a welding method and apparatus which separately plasticizes or melts the surfaces to be joined followed by a subsequent weld matrix mixing process.

2. Background of the Invention

Welding processes can be classified into one of two categories, fusion welding and solid state welding. Fusion welding involves melting material to be welded and includes such processes as MIG, TIG and VPPA welding. Solid state welding joins materials without a melting step and include the processes of friction stir and inertia welding. Fusion weld processes typically result in a dendritic type weld microstructure exhibiting inferior mechanical and structural properties. Such inferior material properties are generally seen in metals subsequent to melting. Conversely, solid state weld processes result in a non-dendritic grain structure exhibiting properties superior to those produced with fusion welding processes.

Both fusion welding and solid state welding have respective limitations. As indicted above, fusion welding compromises the microstructure of the material and thus lessens the physical properties and characteristics of the material. Solid state welding such as inertia welding is limited to rounded structures such as pipe or rod structures.

A recent advancement was made when friction stir welding became available for the solid state welding of materials. Reference is made, for example, to U.S. Pat. Nos. 6,168,067 B1 to Waldron et al. and 6,053,391 to Heideman et al. With the use of friction stir welding, a solid state weld could, for the first time, be provided in applications requiring longitudinal welds, ranging from several inches to an unlimited length. As described in more detail in the aforementioned patents, the friction stir weld process uses a rotating shoulder/pin configuration. The shoulder produces frictional heat to bring the material into a plasticized state and forges the welded material with extremely large forces. To accomplish the necessary large forces for the forging effect, a very robust backing anvil is required for support. The welding pin spins inside the workpiece at the same rate as the shoulder. The dependent motion of the welding pin and shoulder restricts the speed of the welding process.

BRIEF SUMMARY OF THE INVENTION

In accordance with the present invention, a welding method and apparatus are provided for forming a weld joint. The method separates the welding process into separate and discrete steps, one providing heating of first and second abutting elements to be welded to form an interface therebetween of plasticized or melted material and a further matrix transformation step for processing the interface material after cooling to a plasticized phase. The heating process may use any conventional fusion welding process such as laser or plasma torch which initially melts the interface material. Subsequently, a separate grinding/extrusion element recrystallizes possible, undesirable dendritic matrix structures while the interface material is in the plasticized temperature state. Advantageously, separate heating sources can be used to plasticize or melt the respective first and second elements forming the weld joint independently. The independent melting feature provides for the joining of dissimilar metals such as copper and aluminum or stainless steel and titanium.

According to one aspect of the present invention, a welding method is provided for joining a workpiece comprising first and second elements in abutting relation along facing surfaces. The method includes heating the first and second element to plasticize or melt the elements at least at the facing surfaces so as to form an interface therebetween of material in a melted state. If the interface material is heated to a melted state, then the interface material is allowed to cool from the melted state to a plasticized state. Next, the interface material is mixed while in the plasticized state.

According to another aspect of the present invention, an apparatus is provided for forming a weld joint in a workpiece between first and second elements in abutting relation along facing surfaces. The apparatus includes a heating device for plasticizing or melting the first and second elements at least at the facing surfaces so as to form interface therebetween of material in a plasticized or melted state respectively. A mixing tool mixes the interface material when in a plasticized state.

Preferably, the apparatus further comprises forming means for exerting force on the elements to control forming thereof. Advantageously, the temperature of the forming means is controlled to provide heating or cooling of the elements.

In one preferred embodiment, the forming means comprises at least one forging plate. Advantageously, the apparatus further comprises control means for sensing the force exerted by the forging plate and for controlling feeding of the first and second elements based thereon. Preferably, the control means controls one of feed rate and travel speed to control feeding of the elements.

In another preferred embodiment, the forming means comprises a plurality of rollers. In this embodiment, the apparatus preferably further comprises control means for controlling the force exerted by the rollers and for controlling feeding of the first and second elements based thereon. Preferably, the control means controls one of feed rate and travel speed to control feeding of said elements.

Preferably, the apparatus further comprises control means for sensing energy input to the heating elements and for controlling one of feed rate or travel speed of the elements based thereon.

In a preferred implementation, the apparatus further comprises a pre-weld tack welding means located upstream of the mixing tool for tack welding the two elements together prior to mixing by the mixing tool.

Advantageously, the mixing tool is retractable so as to enable complete withdrawal thereof from the first and second elements.

Preferably, the apparatus further comprises containment forging plates for containing the first and second elements during mixing by the mixing tool.

According to yet another aspect of the present invention, a joined workpiece has a first element comprising a first metal material having a first plasticized temperature and a second element comprising a second metal material having a second plasticized temperature different from the first plasticized temperature. A longitudinal weld joint is formed between the first metal element and the second metal element. The weld joint has a recrystallized fine grain matrix.

A key feature of the present invention relates to the separation of a heating process to form a plasticized or melted interface material between two elements to be joined and a mixing process for mixing the interface material together while in a plasticized state. This separation enables each of the respective materials being joined to be heated and plasticized/melted independently. One advantage of this feature is that the invention enables dissimilar metals to be welded together which previously were not able to be joined, i.e., metals such as copper/aluminum, stainless steel/copper, and stainless steel/titanium. For example, a copper/aluminum weld can be achieved by providing independent temperature control as each alloy is brought up to its respective plasticized/melted state. A further advantage of separating the heating process from the weld matrix transformation process is that comparatively high workpiece travel rates during welding can be obtained. In this regard, the present invention is not inherently limited with respective to travel rates as is the case with a friction stir welding process.

An additional important feature of the present invention is that the invention provides matrix transformation of the interface material from dendritic to fine grained material. More specifically, the present invention provides for transforming grain structure from the dendritic-type weld microstructure formed as a result of the heating process to a recrystallized fine, non-dendritic grain structure. As a consequence, the resulting final grain structure is typically that of a solid state weld material and thus exhibits excellent mechanical material properties.

A further advantage of the present invention is that the invention can provide long longitudinal welds of varying material thickness.

Yet another advantage of the present invention is that the invention can be used to form longitudinal welds exhibiting a solid state weld material property without a backing anvil such as is required in stir welding.

Further features and advantages of the present invention will be set forth in, or apparent from, the detailed description of preferred embodiments thereof which follows.

BRIEF DESCRIPTION OF THE DRAWING

FIG. 1 is a longitudinal cross sectional view of a welding apparatus according to a preferred embodiment of the present invention;

FIG. 2 is an end elevational view of the welding apparatus of FIG. 1; and

FIG. 3 is a longitudinal cross sectional view, partially broken away, of a further embodiment of the invention.

DETAILED DESCRIPTION OF THE INVENTION

Referring now to FIG. 1 and FIG. 2, there is shown a welding device, generally denoted 10, which is adapted to join together first and second elements 14 and 16 of a workpiece 12. The welding device 10 includes heating elements 18 and 20.

Heating element 18 provides sufficient heat to plasticize or melt the material of element 14 and may comprise such conventional heating devices as lasers or plasma torches or other suitable devices known in the art. Similarly, heating element 20 provides sufficient heat to plasticize or melt the material of element 16. As a result, together, heating elements 18 and 20 transform a portion of the solid material of the workpiece 12, viz., respective abutting portions of elements 14, 16 to form an interface 34 (see FIG. 2) in a plasticized or melted phase, between the elements 14, 16.

The heating elements 18 and 20 can be controlled individually for providing heating at a desired separate temperature. For example, where elements 14 and 16 comprise dissimilar materials having different melting points, heating element 18, preferably provides heating at the plasticizing or melting temperature of element 14 whereas heating element 20 preferably provides heating at the plasticizing or melting temperature of the material of element 16.

The material of element 14 and element 16 may be formed of the same or different metal material. For example, element 14 may be copper or stainless steel, and element 16 may be aluminum, copper or titanium, so that when joined together, elements 14 and 16 form a workpiece 12 formed of copper/aluminum, or stainless steel/copper or stainless steel/titanium or another combination.

In an alternative embodiment, additional heating elements (not shown) of the type of heating elements 18, 20 may be disposed adjacent to the heating elements 18, 20 and/or below workpiece 12, to assist in plasticizing/melting the abutting portions of the elements 14, 16. An optional tack weld heater 22, disposed upstream, relative to the heaters 18 and 20, provides sufficient heat to form an initial tack weld between the elements 14, 16.

As shown in FIG. 2, a pair of clamping elements 36, 38 apply a respective force on the workpiece 12 towards each other. The force applied maintains elements 14 and 16 in proper alignment with each other.

A mixing tool such as toothed grinding/extruding member 40 is positioned in the path of the interface 34 between elements 14 and 16 and rotates to mix the material of interface 34 when in a plasticized phase. The grinding/extruding member 40 allows plasticized metal of the interface 34 to flow and extrude through the individual teeth, which are indicated at 40a, of member 40. The teeth 40a are angled, thus forcing the plasticized material to flow downwards or upwards depending upon the angle of the teeth 40a. As a result, the grinding/extruding member 40 will recrystallize the dendritic matrix structure which may have been formed in the material of interface 34 as a result of the melting process. Grinding/extruding member 40 is retractable as indicated by arrow A and can be completely withdrawn from the workpiece formed by elements 14 and 16.

A plurality of force actuators 42 are located downstream of grinding member 40 and used to apply a force on a pair of forging plates 44, 46 which are located on opposite sides of workpiece 12. Force actuators 42 include rollers 42a which engage and bear against plates 44, 46. In an alternative embodiment, plates 44, 46 can be eliminated and rollers 42a used to bear directly on the workpiece, i.e., either rollers, or plates, can be used separately to exert the required force to further form the workpiece. Further, the rollers or forging plates can be heated or cooled (e.g., by water cooling) to control the temperature of the workpiece material.

As indicated in the drawings, the heating elements described above and the grinding member 40 extend through forging plates 44, 46 so as to permit them to perform their respective functions. The force exerted upon the forging plates 44, 46 by the force actuators 42 is constant for a workpiece having constant thickness, while a variable force is exerted on the forging plates 44, 46 by the actuators 42 to accommodate workpieces of a tapered thickness.

A pair of motion control devices indicated separately at 48 control the amount of movement of the forging plates 44, 46.

The motion control devices 48 each may comprise a LVDT, a laser device or other suitable motion control device known in the art.

During the operation of the welding device 10, the workpiece 12 is inserted into an entrance 50 of a housing 52 which houses the various elements and units described above. As set forth hereinbefore, the heating elements 18, 20 provide the desired heating of elements 14 and 16, to form the plasticized or melted phase interface 34.

During the heating process, undesirable dendritic-type Weld microstructures may be introduced into the matrix of the interface material 34. Advantageously, the heating process takes place in an inert environment. For example, nitrogen gas can be pumped into housing 52 to provide an inert environment, thereby reducing or eliminating the oxidation of the material of workpiece 12 during the heating process.

The workpiece 12 proceeds through the welding device 10 in a direction denoted by arrow 54. The material of interface 34 is in a plasticized or melted state while in the area generally indicated by reference numeral 56. As the workpiece 12 proceeds along direction 54, if the interface was heated to a melted state, the melted interface is transformed into a plasticized state. The transition point where the melted interface becomes plasticized is denoted by a dashed line 58. The workpiece 12 transitions from the melted state to the plasticized state due to the absence of applied heat. Alternatively, if the material of interface 34 is merely heated to a plasticized state, the interface material remains in a plasticized state as the workpiece proceeds past dashed line 58.

The workpiece 12 then proceeds to the location the grinding/extruding member 40. The interface 34, now in the plasticized state, is processed by the grinding/extruding teeth 40a of member 40 and the plasticized material of interface 34 flows and is extruded through the teeth 40a. As indicated above, this processing of the interface material dramatically recrystallizes the grain structure, thus producing a fine grained weld matrix when fully cooled.

As shown in the drawings, member 40 includes a central mixing portion comprising the grinding/extruding teeth 40a extending along the length thereof and support portions directly connected to the central portion. Considering, for example, the upper support portion, this portion extends through an opening in forging plate 44 which terminates at a major surface at plate 44, as illustrated.

The workpiece 12 next travels past the grinding/extruding member 40 to a location where the hot interface material, which is still in a plasticized state, is forged under pressure by the forging plates 44, 46.

In an advantageous embodiment, a controller or control system 60 is employed which controls the feed rate or travel speed of the workpiece formed by elements 14 and 16 by controlling the force exerted by either the forging plates 44, 46 and/or rollers 42a (whether used separately or in combination, as indicated schematically by the dashed lines in FIG. 1). Although a separate controller 60 is shown, the control system could directly control force actuators 42.

Alternatively, or in addition, a control system or controller 62 is also provided which controls the material feed rate or travel speed by monitoring or sensing the energy input to the heating elements 18 and 20, or as illustrated, the energy input to a further heating element 64. The overall control system could also include a sensor 66 for sensing feed rate or travel speed and supplying a corresponding input signal to controller 62.

Referring to FIG. 3, in accordance with a further important feature of the invention, separate containment forging plates 68 and 70 are provided closely adjacent to or, in one embodiment, in surrounding relation to, the mixing tool 40 so as to contain the heated material of elements 14, 16 during rotation of the grinding teeth 40a of mixing tool 40.

It should be apparent to those of ordinary skill that the present device and process offers important advantages over previous welding methods. These advantages include the ability to weld together dissimilar alloys which previously could not be joined due to differences in their respective melted and plasticized phase temperatures. Further, the separation of the plasticizing/melting process and interface matrix transformation process results in significantly enhanced welding speeds.

Although the invention has been described above in relation to preferred embodiments thereof, it will be understood by those skilled in the art that variations and modifications can be effected in these preferred embodiments without departing from the scope and spirit of the invention.

What is claimed:

1. An apparatus for forming a weld joint in a workpiece, said apparatus comprising:

a support assembly supporting first and second longitudinal elements, as the first and second elements are moved longitudinally to the support assembly, in abutting relation along laterally opposed facing edge surfaces which opposed edge surfaces form an intended longitudinal weld joint of the workpiece;

a heating device for supplying heat to provide plasticizing of the first and second elements at least at a zone of the intended longitudinal weld joint as the first and second longitudinal elements are longitudinally moved past the heating device, so as to form a continuous longitudinal interface between the opposed facing edge surfaces of interface material in a plasticized state;

an elongate mixing tool mounted downstream of the heating device so as to extend between the first and second longitudinal elements, said mixing tool extending through the plasticized interface material from a first side of the first and second longitudinal elements to a second, opposite side thereof, and said mixing tool mixing the plasticized interface material thereat as the first and second longitudinal elements are moved past said mixing tool whereby a longitudinal weld joint is formed downstream from said mixing tool;

a first control means for controlling the heating device so that sufficient heat is provided at the zone to the interface material to ensure that the interface material arriving at said mixing tool is sufficiently plasticized for mixing by the mixing tool to subsequently form the longitudinal weld joint; and a second control means for controlling the mixing tool so that mixing of the plasticized interface material by said mixing tool subsequently forms the longitudinal weld joint; and wherein said support assembly includes first and second, separately controlled, containment forging plates respectively positioned on said first and second sides of the first and second longitudinal elements, said containment forging plates, as the first and second longitudinal elements are longitudinally moved between and relative to said forging plates, a) containing the moving first and second longitudinal elements during mixing by said mixing tool, and b) effecting forging of the moving first and second longitudinal elements downstream of the mixing tool, said containment forging plates each including one major surface thereof in engagement with a respective side of said first and second longitudinal elements so that the first and second longitudinal elements are contained on opposite sides thereof between said containment forging plates, and wherein said mixing tool
- is separate from said first and second containment forging plates,
- includes a central mixing portion located between the containment forging plates, and extending transversely between the containment forging plates from one containment forging plate to the other,
- includes at least one support portion connected directly to the mixing portion and extending through an opening in one of the containment forging plates, the opening terminating at the corresponding major surface of the one containment forging plate in engagement with a surface of one of the first and second longitudinal elements, and
- includes teeth along a length of said central mixing portion which teeth effect the mixing of the plasticized interface material to form the weld joint.

2. The apparatus of claim 1 wherein said heating device comprises first and second separate heat sources.

3. The apparatus of claim 1, wherein said mixing tool comprises a grinding and extruding device.

4. The apparatus of claim 1, further comprising a housing for maintaining an inert environment for the first and second elements when plasticized by said heating device.

5. An apparatus of claim 1, further comprising control means for sensing energy input to said heating device and for controlling one of feed rate and travel speed of said longitudinal elements based thereon.

6. An apparatus of claim 1, further comprising a pre-weld tack welding means located upstream of said mixing tool for tack welding the two longitudinal elements together prior to plasticizing by said heating device and mixing by said mixing tool.

7. An apparatus of claim 1, wherein said mixing tool is retractable so as to enable complete withdrawal thereof from the first and second longitudinal elements.

8. The apparatus of claim 1, wherein said heating device applies heat to the first element at a first element welding temperature and applies heat to the second element at a second element welding temperature different than the first welding temperature.

9. The apparatus of claim 8 wherein said heating device comprises a first heat source for applying heat to said first element and a second, separate heat source for applying heat to said second element.

10. The apparatus of claim 9 wherein said first and second heat sources each comprise a laser.

11. An apparatus of claim 1, further comprising
separately controlled forming means for exerting force on said longitudinal elements to control forming thereof and
separate control means for controlling said forming means.

12. An apparatus of claim 11, wherein the temperature of said forming means is controlled to provide heating or cooling of said longitudinal elements.

13. An apparatus of claim 11, further comprising control means for sensing the force exerted by said at least one forging plate and for controlling feeding of said first and second longitudinal elements based thereon.

14. An apparatus of claim 13, wherein said control means controls one of feed rate and travel speed to control feeding of said longitudinal elements.

15. An apparatus of claim 11, wherein said forming means comprises a plurality of rollers.

16. An apparatus of claim 15, wherein said separate control means comprises control means for controlling the force exerted by said rollers and for controlling feeding of said first and second longitudinal elements based thereon.

17. An apparatus of claim 16, wherein said control means controls one of feed rate and travel speed to control feeding of said longitudinal elements.

* * * * *